United States Patent [19]

Monger

[11] Patent Number: 5,383,281
[45] Date of Patent: Jan. 24, 1995

[54] ELECTRICIAN'S CENTER POINT GAUGE TO FACILITATE PLACING CONDUIT HOLES IN ELECTRICAL BOXES

[76] Inventor: Robert T. Monger, P.O. Box 221, Mt. Crawford, Va. 22841

[21] Appl. No.: 101,013

[22] Filed: Aug. 3, 1993

[51] Int. Cl.[6] .......................................... G01D 21/00
[52] U.S. Cl. ........................................ 33/520; 33/644; 33/671
[58] Field of Search ................ 33/1 G, 516, 520, 528, 33/529, 644, 671, DIG. 10

[56] References Cited

U.S. PATENT DOCUMENTS

| | | | |
|---|---|---|---|
| 1,160,752 | 11/1915 | Pfleiderer et al. | 33/520 |
| 1,644,403 | 10/1927 | Schlage | 33/671 |
| 2,233,696 | 3/1941 | Eliel et al. | 33/671 |
| 2,529,413 | 11/1950 | Petersen | 33/1 B |
| 2,750,672 | 6/1956 | Danilow | 33/1 B |
| 2,764,818 | 10/1956 | Gard | 33/520 |
| 4,338,724 | 7/1982 | Johnson | 33/528 |
| 4,342,145 | 8/1982 | Kotchy | 33/DIG. 10 |
| 4,345,381 | 8/1982 | Brislin | 33/528 |
| 4,622,753 | 11/1986 | Jones et al. | 33/DIG. 10 |

FOREIGN PATENT DOCUMENTS 0819020  7/1969  Canada .................................. 33/520

*Primary Examiner*—Thomas B. Will
*Attorney, Agent, or Firm*—Brady, O'Boyle & Gates

[57] ABSTRACT

An electrician's center point gauge to facilitate placing conduit holes in electrical boxes wherein a circular disc is provided having a center hole and four 90°, circumferentially spaced notches in its peripheral edge. A trace is made of the circumferential edge of the disc, notches and center hole. Diametrical lines are drawn through the center of the circumferential trace and notches to facilitate the positioning of a conventional knockout set on the side wall of the electrical box for pulling a hole for a conduit therethrough.

6 Claims, 2 Drawing Sheets

U.S. Patent    Jan. 24, 1995    Sheet 1 of 2    5,383,281
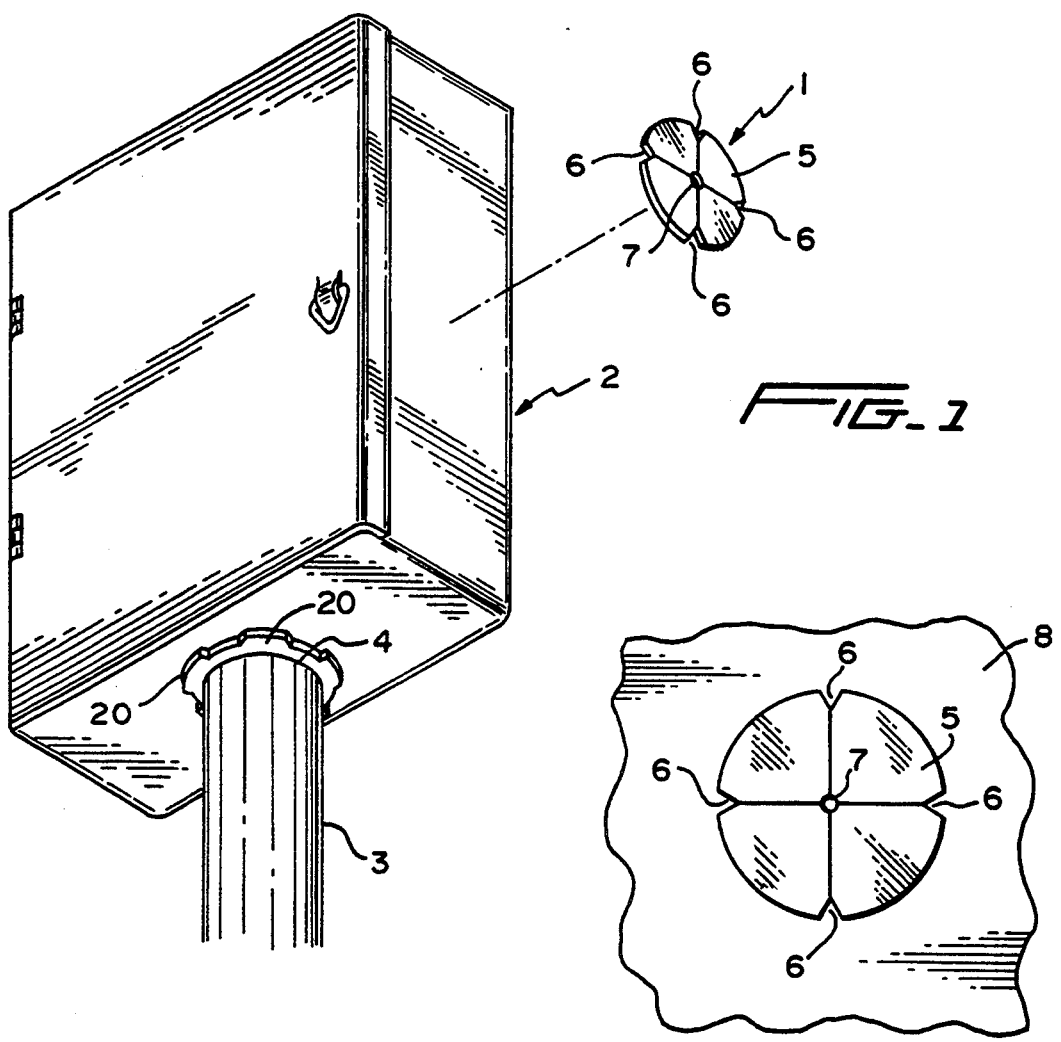
FIG. 1
FIG. 2
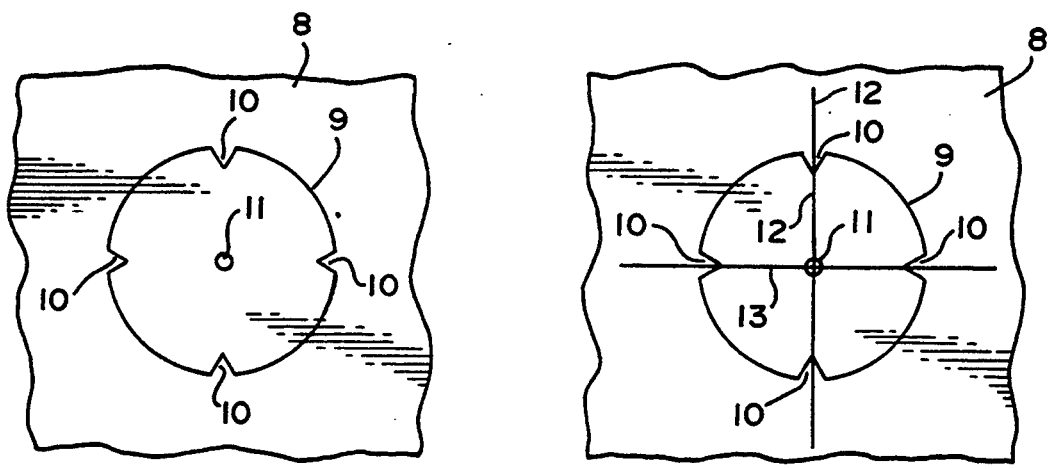
FIG. 3
FIG. 4

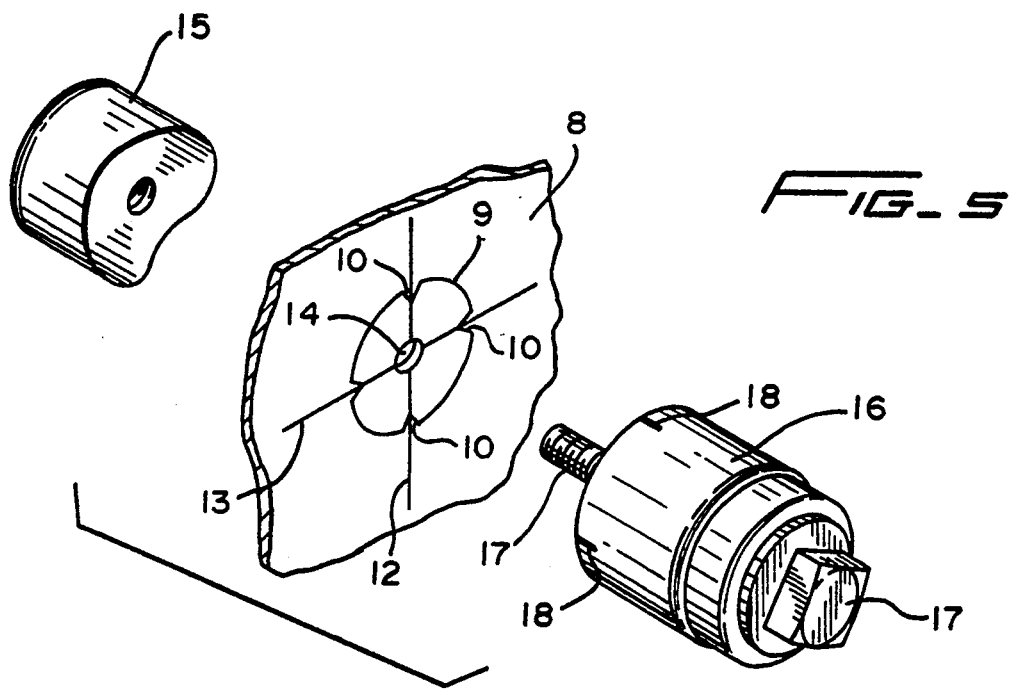
FIG_5
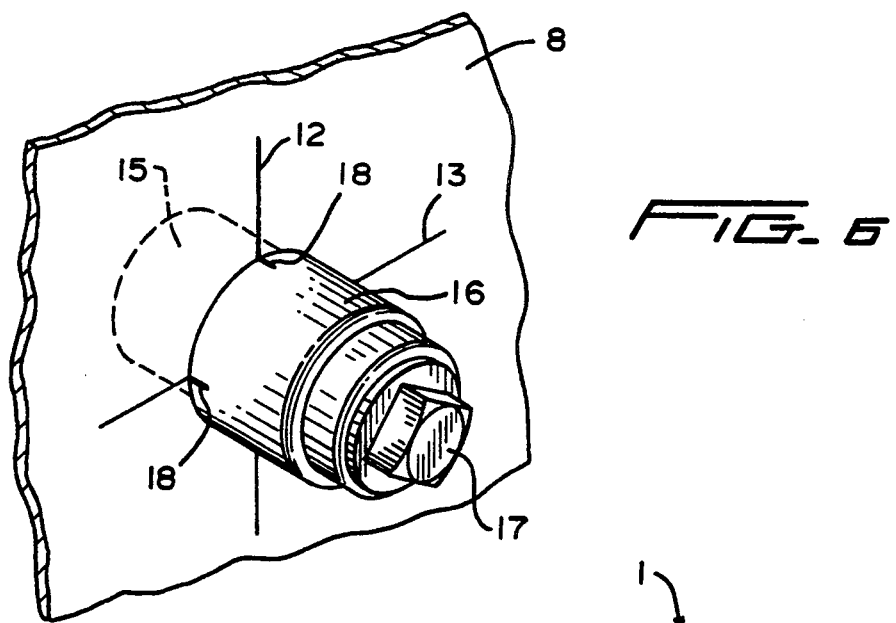
FIG_6
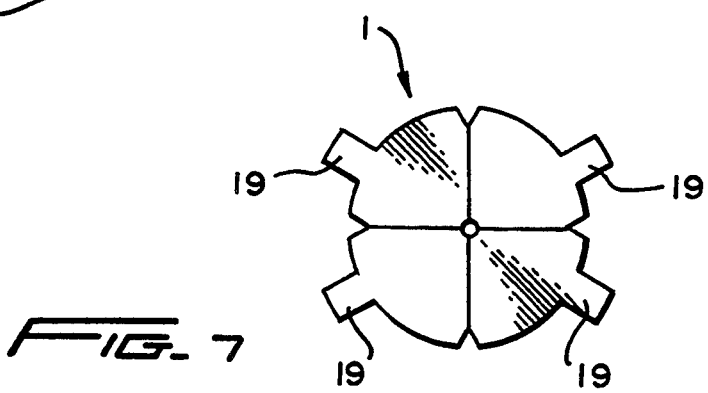
FIG_7

ELECTRICIAN'S CENTER POINT GAUGE TO FACILITATE PLACING CONDUIT HOLES IN ELECTRICAL BOXES

BACKGROUND OF THE INVENTION

Heretofore, when placing a conduit hole in a wall of an electrical box for the installation of an electrical conduit, it was necessary for the electrician to determine the diameter of the electrical conduit and mark the exact center of the conduit on the box wall. This was usually done by measuring the diameter of the conduit and transferring it to the box side wall with a rule and straight edge. The hole is formed by a conventional knockout set which includes a circular die and cylindrical anvil interconnected by a threaded bolt. A hole is drilled through the box wall at the point marked as the center of the conduit. The die is placed on the outside of the box against the wall; the cylindrical anvil is placed on the opposite side of the box wall, and the bolt extends through the anvil, the drilled hole in the box wall and into the die. By tightening the bolt, the die is drawn through the box wall and into the cylindrical anvil to thereby form a conduit opening in the box wall, which should be positioned correctly for the installation of the electrical conduit if the center of the conduit was laid out correctly on the box wall. Through experience, this method of determining the exact center of a conduit has been found to be time consuming and inexact.

SUMMARY OF THE INVENTION

After considerable research and experimentation, the center point gauge of the present invention has been devised which comprises, essentially, a circular disc having a diameter corresponding to the diameter of an electrical conduit to be installed on the wall of an electrical box. The disc is provided with a hole at its center point, and four 90° circumferentially spaced notches provided in its peripheral edge.

In use, the disc is placed on the wall of an electrical box where it is desired to place an electrical conduit hole. The center hole of the disc is marked on the box and the circumference of the disc is traced on the box wall, whereby a center mark and a circle having four 90° circumferentially spaced notches are drawn on the box wall. Straight lines are then drawn between diametrically opposite notches and extend radially outwardly beyond the peripheral edge of the circle. The cylindrical anvil of the conventional knockout, having four 90° circumferentially spaced score lines on the cylindrical wall thereof, is placed on the circle drawn on the box wall with the score lines thereof aligned with the portions of the diametrical lines extending beyond the peripheral edge of the circle, whereby the knockout is aligned and the hole can be pulled in the box wall.

A plurality of discs of various diameters will be provided to accommodate electrical conduits of various diameters.

The disc may also include a plurality of tabs extending radially outwardly from the peripheral edge of the disc. The tabs correspond to the circumferentially spaced spanner lugs provided on the conventional threaded collars employed for coupling the conduit to the box. By this construction and arrangement, when holes are being placed in the box wall in side-by-side relationship, the tabs on the disc will also be traced on the box wall so that not only will the center lines of adjacent conduits be laid out correctly but also the spanner lugs on the adjacent threaded collars of the conduit coupling.

BRIEF DESCRIPTION OF THE DRAWINGS

FIG. 1 is a perspective view of an electrical box, illustrating the gauge of the present invention being placed on the side wall of the box;

FIG. 2 is a fragmentary, elevational view showing the gauge positioned on the side wall of the box;

FIG. 3 is a fragmentary, elevational view of the circumferential and center trace of the gauge on the side wall of the box;

FIG. 4 is a fragmentary, elevational view of the trace shown in FIG. 3 with the addition of diametrical straight lines extending beyond the peripheral edge of the traced circle;

FIG. 5 is a fragmentary, exploded view showing the trace of FIG. 4 having the center hole of the circle enlarged for receiving the threaded bolt of the knockout die assembly;

FIG. 6 is a fragmentary, perspective view showing the knockout mounted on the box wall with the score lines on the circular die aligned with the diametrical lines of the trace; and FIG. 7 is an elevational view of another embodiment of the gauge wherein circumferentially spaced, radially extending tabs are provided so that adjacent holes can be accurately positioned on the box wall.

DESCRIPTION OF THE PREFERRED EMBODIMENTS

Referring to the drawings and more particularly to FIG. 1, the gauge 1 of the present invention is employed to facilitate placing a hole in the side wall of an electrical box 2, whereby an electrical conduit 3 can be coupled to the box by a threaded collar 4. The gauge comprises a circular disc 5 having four notches 6 provided in the peripheral edge of the disc and spaced 90° around the circumference thereof, and a hole 7 is provided in the center of the disc 5.

In use, as shown in FIG. 2, the disc 5 is placed on the side wall 8 of an electrical box to which it is desired to connect an electrical conduit, and the peripheral edge and center of the disc 5 are drawn on the side wall as shown in FIG. 3, to provide a circular trace 9 having circumferentially spaced V-shaped recesses 10 in the peripheral edge thereof, and a small circle 11 in the center thereof. As will be seen in FIG. 4, straight lines 12 and 13 are then drawn between diametrically opposite recesses 10 and extend radially outwardly beyond the peripheral edge of the circular trace 9.

As will be seen in FIG. 5, a hole 14 is drilled through the center 11 of the circular trace 9, and a conventional knockout set, including a circular die 15, a cylindrical anvil 16, and a connecting bolt 17, is mounted on the electrical box wall 8 as shown in FIG. 6. The circular die 15 is placed on one side of the wall 8, and the cylindrical anvil 16 is placed on the opposite side of the wall 8. The bolt 17 extends through the central hole 14 and is threaded into the circular die 15. The cylindrical anvil 16 has four score lines 18 spaced 90° apart which are manually aligned with the diametrical lines 12 and 13. The bolt 17 is then tightened to draw the circular die 15 into the cylindrical anvil 16, whereby an opening is formed in the side wall 8 which is positioned correctly for the installation of an electrical conduit.

FIG. 7 illustrates another embodiment of the invention wherein the gauge 1 is provided with a plurality of circumferentially spaced, radially extending tabs 19 which correspond to the conventional spanner lugs 20 provided on the threaded collar 4 which is employed for connecting the electrical conduit 3 to the box 2.

In use, a circular trace is made on the box side wall 8, as noted above with regard to FIGS. 3 and 4, but also including a trace of the radial tabs 19. By this construction and arrangement, adjacent holes can be accurately positioned on the box wall 8 for not only receiving a pair of electrical conduits 3, but also for accommodating adjacent collars 4 employed for securing the respective conduits to the box wall.

From the above description, it will be readily appreciated by those skilled in the art that the gauge 1 of the present invention provides an improved tool for use by electricians for quickly and accurately pulling holes in the side walls of electrical boxes for the installation of electrical conduits.

It is contemplated that a plurality of gauges 1 of various sizes will be packaged as a kit so that the electrician will choose a gauge having a certain diameter corresponding to the size of the electrical conduit being installed.

While the gauge 1 can be fabricated from various materials, the gauge 1 of the present invention is made from a thin sheet of plastic which is punched-out to provide a plurality of gauges.

It is to be understood that the forms of the invention herewith shown and described are to be taken as preferred examples of the same, and that various changes in the shape, size and arrangement of parts may be resorted to, without departing from the spirit of the invention or scope of the subjoined claims.

I claim:

1. An electrician's center point gauge to facilitate placing conduit holes in electrical boxes comprising, a circular disc having a diameter corresponding to the diameter of an electrical conduit to be installed on the wall of an electrical box, a plurality of circumferentially spaced notches provided on the peripheral edge of said disc, whereby the disc is placed on the electrical box side wall and a trace is made of the circumference of the disc; and diametric lines are drawn through the traced circumferentially spaced notches and extend radially outwardly beyond the circumferential trace, to thereby locate the center of the circumferential trace and to facilitate the positioning of a conventional knockout set for pulling a hole through the electrical box side wall, and a plurality of circumferentially spaced, radially extending tabs on the peripheral edge of said disc, said tabs being dimensioned to correspond to spanner lugs provided on conventional threaded collars employed for securing the electrical conduit to the side wall of the electrical box, whereby adjacent holes can be formed in the box side wall for accurately locating adjacent electrical conduits mounted in respective box side wall holes.

2. A method of accurately placing electrical conduit holes in a side wall of an electrical box to facilitate the installation of electrical conduits therein comprising the steps of:

a) placing a circular disc having at least four 90° circumferentially spaced notches on the peripheral edge thereof, and of a size corresponding to the diameter of the conduit to be installed, on the side wall of the electrical box;

b) tracing the circumference of said disc and said notches on said side wall;

c) drawing diametrical lines through opposite notches to locate the center of the circumferential trace; and d) drilling a hole through the side wall at the center point of the circumferential trace.

3. A method of accurately placing electrical conduit holes in a side wall of an electrical box according to claim 2 wherein the diametrical lines are extended radially outwardly of the circumferential trace and comprising the additional steps of:

e) placing a circular die on one side of the box side wall;

f) placing a cylindrical anvil on the other side of the box side wall; and aligning score lines on the peripheral surface of the cylindrical anvil with the extended diametrical lines of the trace;

g) inserting a bolt through the cylindrical anvil, side wall hole and circular die;

h) aligning the peripheral surface of the cylindrical anvil with the circumferential trace; and i) tightening the bolt to draw the circular die through the box side wall and into the cylindrical anvil, to thereby provide an electrical conduit hole in the side wall of the electrical box.

4. A method of accurately placing electrical conduit holes in a side wall of an electrical box according to claim 2, wherein a plurality of circular discs of various sizes are provided, each having a respective diameter corresponding to the diameter of an electrical conduit to be installed on the wall of the electrical box.

5. The method of claim 2, wherein the disc has a plurality of circumferentially spaced, radially extending tabs on the peripheral edge thereof corresponding to spanner lugs of a threaded collar employed for securing the electrical conduit in the side wall of the box, tracing the outline of the tabs when tracing the circumferential edge of the disc, whereby adjacent holes in the box side wall can be accurately located.

6. The method of claim 2, wherein the disc has a hole at its center point, tracing the center point hole when tracing the circumferential edge of the disc to thereby provide a center point of the circumferential trace to facilitate the drilling of the hole therethrough.

* * * * *